Feb. 9, 1960 W. T. RENTSCHLER 2,924,162
PHOTOGRAPHIC CAMERA
Filed Sept. 26, 1956
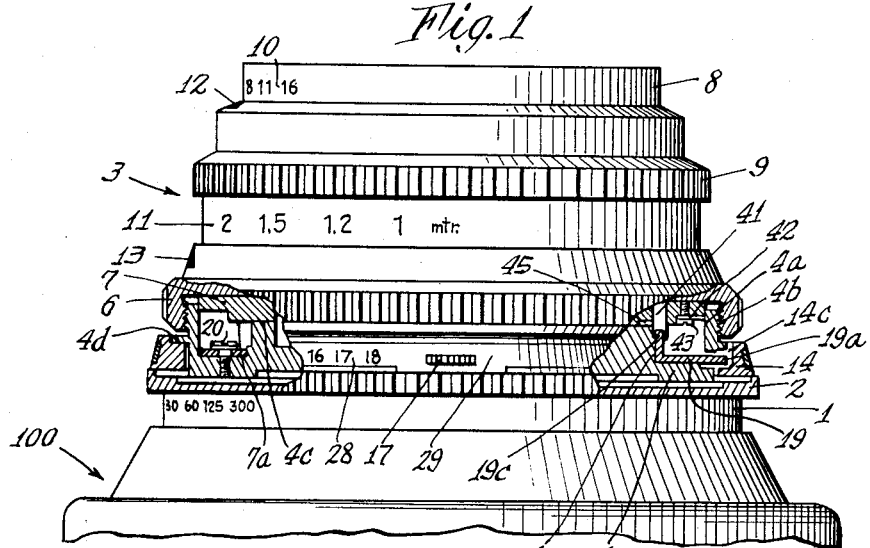
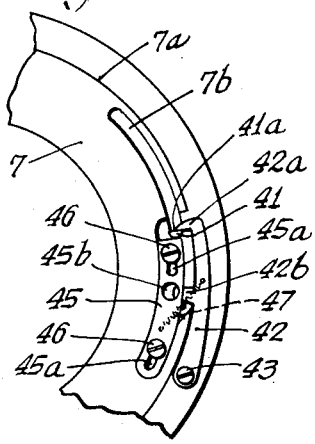
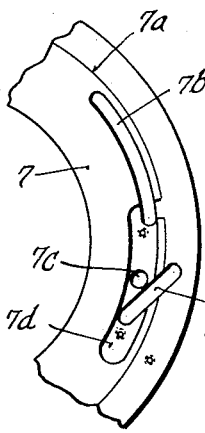
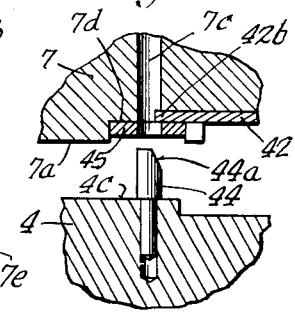
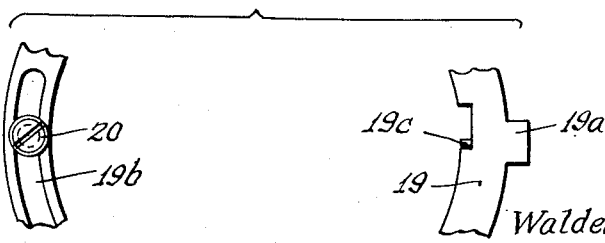
INVENTOR.
Waldemar T. Rentschler
BY
Munn, Liddy, Nathanson & March
ATTORNEYS

United States Patent Office 2,924,162
Patented Feb. 9, 1960

2,924,162

PHOTOGRAPHIC CAMERA

Waldemar T. Rentschler, Calmbach (Enz), Germany, assignor to Alfred Gauthier G.m.b.H., Calmbach (Enz), Germany, a corporation of Germany Application September 26, 1956, Serial No. 612,208

Claims priority, application Germany March 13, 1956

9 Claims. (Cl. 95—64)

This invention relates to photographic cameras having intra-lens shutters provided with interchangeable lenses disposed forwardly of the shutter blades, and more particularly to the above structures wherein there is effected concurrent setting of the diaphragm and exposure-time mechanisms.

The present invention is concerned with further improvements in the camera, shutter and lens structure illustrated and described in my copending application, Serial No. 612,189 filed Sept. 26, 1956, and entitled Photographic Camera.

The subject matter of this copending application comprises a photographic camera having an intra-lens shutter and interchangeable lens assembly all arranged in front of the shutter blades. In this referred to structure, coupling of the diaphragm setting mechanism of the lens assembly with the exposure-time mechanism is effected through a transmission ring which is connected on the one hand with the exposure-time setting ring by a releasable and adjustable clasp. Such transmission ring is associated on the other hand, with a coupling device including a supporting member having a separable driving connection with the diaphragm setting means of the lens assembly. The structure disclosed in my copending application is simple, saving of space, and functionally reliable and effective; moreover it does not place special requirements on the interior construction of the shutter. In addition, the coupling means in this copending application has the advantage that the relation between the diaphragm and exposure time is automatically preserved when a new lens assembly is made to replace a previous one.

When mounting such a new lens assembly on the camera, it is only necessary to make sure that the mating parts of the releasable or separable coupling are brought into engagement with each other, and to make sure that the keying means is properly aligned, prior to securing in place the new lens assembly. When this is done, the correct time-diaphragm proportion is automatically effected.

However, such operation of mounting a new lens assembly on the camera necessitates a certain amount of attention on the part of the operator, due to the simultaneous aligning or engaging of two cooperable or interfitting connections. This requirement imposed on the operator is obviated by the present invention, and one object of the invention is to provide a novel and improved camera, shutter structure and lens assembly of the type set forth in my copending application, wherein the mounting of a new lens assembly requires no more attention from the operator than is needed to mount a lens assembly on a camera without the feature of the time-diaphragm coupling.

This is accomplished, in accordance with the invention, by providing within the lens assembly a spring means continually biasing the diaphragm mechanism toward one end of its movement, and by the provision of a lost-motion coupling means, as for example a pin, adapted to abut and engage under the action of the said biasing spring a stop lug rigid with the said transmission ring.

In carrying out the invention a closed outward appearance of the camera structure is preserved by arranging the coupling means within the confines of the lens assembly.

For the purpose of actuating the diaphragm mechanism against the action of its biasing spring, it is possible to provide a manually operable ring or handle which may be conveniently grasped by the operator and which is disposed exteriorly of the lens assembly.

The invention further provides means by which one-hand operation is possible, in interchanging lens assemblies, such means including a locking or latching means carried by the lens assembly and adapted to hold the diaphragm mechanism at one extremity of its movement against the action of the biasing spring therefor.

Moreover, there is provided by the invention an automatically operative device for releasing said latching means in response to mounting of the lens assembly on the shutter structure, and for this purpose the latching means may be made to cooperate with a part rigidly carried by the camera.

Simplicity and reduction in the number of parts may be effected by making the latching means cooperable with a well known locating means or pin, usually provided on the camera to act as a keying means. Moreover, the latching means may be advantageously constructed in the form of a one-armed lever, normally held under spring action.

To prevent inadvertent mounting of the lens assembly on the camera while the diaphragm mechanism is unlocked or unlatched, there is provided a blocking means cooperable with said keying or positioning pin, by which attachment of the lens assembly is interfered with and prevented unless the diaphragm mechanism is first properly latched or cocked.

The blocking means may be advantageously constituted as a slide held under spring action, such slide being movable by a component of the releasable and separable coupling means provided between the transmission member and the diaphragm mechanism.

Other features and advantages will hereinafter appear.

In the drawings accompanying this specification, similar characters of reference indicate corresponding parts wherever possible in the several views, in which:

Figure 1 is a view partly in side elevation and partly in section of an intra-lens shutter structure and front portion of a camera, said shutter structure having an interchangeable lens, the diaphragm mechanism of which is coupled with the exposure-time setting of the shutter structure.

Fig. 2 is a fragmentary plan view of latching and blocking members associated with and forming part of a coupling means as provided by the invention, such members being disposed at the rear of the interchangeable lens assembly.

Fig. 3 is a view like Fig. 2, but with some of the components removed, to reveal interior details.

Fig. 4 is a fragmentary sectional view of a fixing device and locking member, such sectional view being in part through the structure of Fig. 2.

Fig. 5 is a fragmentary top or plan view of a supporting ring constituting a part of the releasable coupling means.

In the above figures, parts and components which are similar to those appearing in the construction of my referred-to copending application, have in general been given like characters.

As in my copending application, the housing of the intra-lens shutter is indicated at 1, said housing being mounted on the front portion or wall 100 of a camera.

In front of the camera shutter there is mounted for turning movement in a well known manner an exposure-time setting ring 2, and in front of the ring 2 there is fixedly carried a plate 4 adapted to support the interchangeable lens assembly 3.

For the purpose of securing the lens assembly 3 in its operative position, the plate 4 has a nozzle 4a provided with an external screw thread 4b which is engaged by an internally threaded ring 6 constituting a turnable part of the lens assembly 3.

The inner cylindrical wall of the nozzle 4a is engaged by a ring 7 of the lens assembly 3, for the purpose of centering the latter. The ring 7 has a face 7a adapted to engage a shoulder or flange 4c on the plate 4, for the purpose of axially positioning the lens assembly 3.

Also, disposed between the exposure-time setting ring 2 and the lens assembly 3 there is a transmission ring 14, said transmission ring being turnable about the plate 4 and being retained in place by a flange 4d on the nozzle 4a.

The transmission ring 14 carries a fingerpiece or handle 17, which is radially movable in a slot provided in the ring, said fingerpiece actuating a spring latch engaged with a notched ring secured to the exposure-time setting ring 2, thereby to releasably connect the latter with the transmission ring 14 in various different relative rotative positions. Details of the said spring latch and notched ring are not given here, since they form no part per se of the present invention and since they are fully and completely described and illustrated in my copending application referred to.

In the said copending application I provide a coupling means including a supporting device or bushing rigid with the transmission ring 14, said bushing being adapted to receive a pin connected with the diaphragm setting means of the interchangeable lens assembly. The engagement of said pin in the bushing occurs when the lens assembly is attached to the shutter structure. In one of the embodiments of the invention illustrated in this copending application the bushing is carried exteriorly on the transmission ring, and in another embodiment it is mounted on a separate flat ring disposed inside of and secured to the transmission ring.

In accordance with this invention, referring to Figs. 1 and 5, I provide such a flat ring 19, turnably mounted on the mounting plate 4 and guided by a shoulder 4e on said plate. The flat ring 19 has a lug 19a, Figs. 1 and 5, received in a recess 14c of the transmission ring 14, by which a direct and positive drive is established between said rings. Retention of the flat ring 19 on the plate 4 is effected by screws 20 passing through slots 19b in the flat ring and threaded into the plate 4, the lengths of the slots corresponding to the maximum adjusting movement required of the transmission ring 14.

In accordance with this invention, the interchangeable lens assembly 3 is provided with spring means (not drawn for the sake of clarity) by which the diaphragm adjusting mechanism of the assembly is urged to and held in one of its end positions. Such spring, for example, may be similar to springs used in well known lens assemblies having preselection diaphragms. Also, the invention provides a novel indirect coupling device comprising a releasable coupling means including a lost-motion driving connection, and in carrying this out, the diaphragm mechanism of the lens assembly 3 is connected with a coupling member which in turn may abut a stop connected to the transmission ring 14, as will be now described.

Referring to Figs. 1 and 2, the said releasable coupling means and lost-motion connection comprises a cylindrical pin 41 disposed within the lens assembly and attached to a ring or disk (not shown) which is connected with the daiphragm mechanism in a well known manner. As shown, the pin 41 may advantageously extend through a slot 7b provided in the ring 7. For cooperation with the pin 41 there is provided on the ring 19 a stop in the form of a bent finger or lug 19c (Figs. 1 and 5) and the aforementioned spring which influences the diaphragm mechanism normally holds the pin 41 in abutting engagement with the lug 19c.

Accordingly it will be understood that when the transmission ring 14 is turned in response to setting of the exposure-time setting ring 2, such movement will cause the pin 41 to be driven by the lug 19c or to follow the lug 19c by virtue of the spring bias, as the case may be, depending on the direction of turning. Thus, there will occur concurrent adjustment of the diaphragm setting mechanism whereby the diaphragm and exposure-time settings will be correlated and need not be made independently of each other.

By the provision of the coupling means comprising the pin 41 and the lug 19c within the confines of the lens assembly 3 and the transmission ring 14, there is preserved an advantageous closed appearance of the shutter structure and camera. The diaphragm ring 8 located at the front of the lens assembly 3 is provided with a scale 10 which may be referred to an index mark 12 disposed on a stationary part of the lens assembly, and since the ring 8 is connected with the diaphragm mechanism it will provide a means for obtaining readings of different diaphragm openings. Also, there is provided on the lens assembly 3 a distance setting ring 9 having a scale 11 graduated in distances, said scale being cooperable with an index mark 13 to enable readings to be had.

When mounting the lens assembly 3 on the shutter structure it is necessary that the coupling member or pin 41 occupy a position, with respect to the stop or lug 19c, such that subsequently it may be made to engage or lie close to said lug in response to the spring or bias imparted to the diaphragm mechanism.

A proper positioning of the pin 41 is insured, for all possible adjusted positions of the transmission ring 14, by the mere procedure of grasping the diaphragm setting ring 8 and moving it against its spring bias to the limit of such movement, and then maintaining this position while the lens assembly is attached to the shutter structure.

In some instances it may be considered undesirable, in the interest of maximum ease and simplicity, to so hold the diaphragm setting ring 8 during attachment of the lens assembly 3. Therefore, further in accordance with the invention, there is arranged on the lens assembly 3 a locking means by which the pin 41 may be automatically held in the desired end position of the diaphragm mechanism, against the spring bias thereof, when the lens assembly is not being carried by the shutter structure. To further simplify the action, such locking member is automatically rendered inoperative during the time that the lens assembly is mounted.

In the illustrated embodiment of the invention, the said locking means comprises a one-armed lever 42, Fig. 2, pivoting about a screw 43 threaded into the marginal portion of the ring 7. The lever 42 is spring biased in a counterclockwise direction by a helical expansion spring 47, as shown. At its free end, the lever 42 has a locking nose 42a adapted to cooperate with a flattened surface 41a (Fig. 2) provided at the end of the coupling pin 41.

For the purpose of automatically releasing the lever 42 in response to mounting of the lens assembly 3 on the shutter structure, the lever is provided with a lug 42b extending into a bore 7c (Fig. 4) in the ring 7 when the lever 42 is in locking position. The bore 7c is adapted to receive a locating pin 44 carried by the camera, preferably on the plate 4, such pin having a sloping camming surface 44a arranged to engage and displace the lug 42b as the pin 44 is made to enter the bore 7c. Thus, in response to such entering movement of the pin, the lever 42 is shifted clockwise as viewed in Fig. 2, against the action of the spring 47, thereby to release the coupling pin 41 and enable the latter to spring against and engage the lug 19c.

For the purpose of preventing inadvertent mounting of the lens assembly 3 when the diaphragm mechanism is not locked against its bias by the lever 42, there is further provided a blocking member which prevents entrance of the pin 44 in the bore 7c when such lock is not operative. This blocking member is rendered ineffective to prevent entrance of the pin 44 in response to movement of the diaphragm mechanism against the biasing action of the spring thereof, and locking of said mechanism at one end position.

In the present illustrated embodiment of the invention the blocking member comprises a slide strip 45 carried by the lens assembly 3 in a slot or recess 7d thereof (Figs. 3 and 4), the recess 7d extending on opposite sides of the bore 7c and being located in the surface 7a of the ring 7. The slide member 45 is movable, between limits, circumferentially of the lens assembly, and is positioned and confined by screws 46 threaded into the ring 7 and passing through longitudinal slots 45a in the slide member. Also, the slide member 45 is connected with one end of the spring 47 influencing the lever 42, and to accommodate the spring 47 a recess 7e is provided in the ring 7 (Fig. 3). The spring 47 normally tends to move the slide upward or in a counterclockwise direction, as viewed in Fig. 2, and the slide has a bore 45b adapted to be aligned with the bore 7c in the ring 7. It will be understood that with the lens assembly 3 removed from the shutter structure and with the diaphragm mechanism unlatched, the spring 47 will hold the slide 45 in a position characterized by misalignment of the bores 45b and 7c. However, when the diaphragm mechanism is shifted against its biasing spring and locked at one extremity of its movement by the latching arm 42, the pin 41 will engage and shift the slide 45 so as to align the bores 45b and 7c.

The function of the device of the present invention is as follows: When it is desired to remove the lens assembly 3 and use another lens assembly, this is done in the well known manner by loosening the threaded ring 6. Upon such removal of the first lens assembly, the spring associated with the diaphragm mechanism will automatically shift the latter to one extremity of its movement. This shifting will occur upon disengagement of the pin 41 from the lug 19c.

Prior to installing the next lens assembly, the setting ring 8 thereof will be turned by the operator against the spring action of the diaphragm mechanism, to the opposite end or extremity of movement of the mechanism, causing the latch arm 42 to latch the pin 41 and lock the diaphragm mechanism at the said other extremity. The pin 41 will shift the slide 45 so as to align the bores 45b and 7c. Now the lens assembly may be attached to the shutter structure by the operator, making sure only that the locating pin 44 is made to enter the aligned bores 45b and 7c. Such entry of the pin 44 will of course displace the latching lever 42 so that the pin 41 is released thereby. Upon this occurring, the spring bias of the diaphragm mechanism will cause a shifting of the latter until the pin 41 engages the lug 19c of the flat ring 19. Upon this occurring the time diaphragm proportion which was set with the previous lens assembly 3 is now re-established automatically, providing of course that the diaphragm mechanisms of the various lens assemblies are uniformly constructed and adjusted.

It will be understood that, prior to installation of a new lens assembly 3 on the shutter structure, the latching of the diaphragm mechanism may be accomplished by directly actuating the pin 41 instead of actuating the scale ring 8. Also, the diaphragm scale 10 may be carried by the scale band 29 of the transmission ring 14, which band is also provided with the exposure value scale 28. A suitable index mark may, of course, be provided for the scale 10 upon such relocation. Thus, it is possible to omit entirely the ring 8, should this be desired, thereby resulting in a further simplification of the structure and operation of the lens assembly.

Accordingly it is seen that, by the present invention there is provided a photographic camera with intra-lens shutter and interchangeable lenses disposed at the front of the shutter blades, wherein the diaphragm setting mechanism of the lens assembly is coupled with the exposure-time setting ring by structure concentric about the shutter axis. With such construction, the exchanging of lens assemblies can be effected very easily, with the use of but one hand. This will be evident from the fact that both the latching of the diaphragm mechanism against the spring bias thereof, as well as the mounting of the lens assembly, constitutes a one hand operation. Accordingly, a camera constructed in accordance with the above may be easily adapted to various conditions of exposure requiring interchanging of lenses, and such interchange may be simply effected with a minimum of attention on the part of the operator, the operation being virtually as simple as that employed with cameras wherein there is no diaphragm coupling.

Variations and modifications may be made within the scope of the claims and portions of the improvements may be used without others.

I claim:

1. A photographic camera structure including a removable interchangeable lens assembly removable from the remainder of the camera structure and having a diaphagm setting mechanism and mounting means independent of actuation of said diaphragm setting mechanism, by which said assembly is releasably mounted in front of the shutter blades on the remainder of the camera structure, and including an exposure-time setting ring disposed on said remainder of the camera structure adjacent said mounting means and not directly connectable with said diaphragm setting mechanism, said remainder of the camera structure having an indirect coupling device comprising a turnable transmission ring separate from the exposure time setting ring and disposed concentrically about the shutter axis; means including a manually releasable coupling device connecting said transmission ring to the exposure-time setting ring for concurrent movement therewith, said rings being relatively adjustably shiftable to take into account exposure values, both said rings being adapted to remain in given adjusted positions; a separable lost-motion connection between the diaphragm setting mechanism of the lens assembly and the transmission ring, said connection including cooperable relatively movable abutting parts capable of wide separation with the lens assembly mounted on the remainder of the camera structure, one of said abutting parts being permanently carried by the remainder of the camera structure and the other abutting part being permanently carried by the lens assembly and said abutting parts becoming wholly and completely separated and detached from each other when the lens assembly is removed from the remainder of the camera structure; and spring means associated with said diaphragm setting mechanism, for biasing the same toward one of its end positions, said spring means maintaining the said abutting parts in engagement with each other at all times that the lens assembly is mounted on the remainder of the camera structure.

2. The invention as defined in claim 1 in which the said abutting parts are disposed within the confines of the lens assembly.

3. The invention as defined in claim 2 in which there is a manually operable member movably carried by the lens assembly and connected with the diaphragm mechanism, for actuating the same against the action of the said biasing spring means.

4. The invention as defined in claim 2 in which there is a movable releasable latch carried by the lens assembly, for locking the diaphragm mechanism in an end position against the action of its biasing spring means, 5. The invention as defined in claim 4 in which there is means for moving said latch to release the same in response to mounting of the lens assembly in the camera structure, said means including a member fixedly mounted with respect to the remainder of the camera structure and engageable with said latch.

6. The invention as defined in claim 5 in which there is a key means for insuring proper positioning of the lens assembly in the camera structure, said key means including said member fixed with respect to the camera structure.

7. The invention as defined in claim 4 in which the latching means comprises a one-armed lever, and in which there is a spring providing a bias to said lever.

8. The invention as defined in claim 6 in which there is a blocking means engageable with said fixed member, for blocking the lens assembly to prevent its attachment to the camera structure, said blocking means being movable and being rendered inoperative when the diaphragm mechanism of the lens assembly is latched in its end position.

9. The invention as defined in claim 8 in which the blocking means comprises a spring biased slide, said slide being movable by one of the said abutting parts.

References Cited in the file of this patent

UNITED STATES PATENTS

| 2,269,401 | Steiner | Jan. 6, 1942 |

FOREIGN PATENTS

| 903,242 | France | Jan. 8, 1945 |
| 309,208 | Switzerland | Nov. 1, 1955 |
| 310,855 | Switzerland | Jan. 14, 1956 |